United States Patent [19]
Freeburg et al.

[11] Patent Number: 5,134,615
[45] Date of Patent: Jul. 28, 1992

[54] FREQUENCY AGILE TDMA COMMUNICATIONS SYSTEM

[75] Inventors: Thomas A. Freeburg, Arlington Hgts., Ill.; Willy Gehardt, Wiesbaden, Fed. Rep. of Germany; John Ley, McHenry, Ill.

[73] Assignee: Motorola, Inc., Schaumburg, Ill.

[21] Appl. No.: 593,146

[22] Filed: Oct. 5, 1990

[51] Int. Cl.$^5$ .............................................. H04J 3/17
[52] U.S. Cl. ...................................... 370/95.3; 370/50
[58] Field of Search .................. 370/95.1, 95.3, 104.1, 370/50, 29, 30

[56] References Cited

U.S. PATENT DOCUMENTS

| | | | |
|---|---|---|---|
| 4,642,806 | 2/1987 | Hewitt et al. | 370/95.3 |
| 4,799,252 | 1/1989 | Eizenhöffer et al. | 370/50 |
| 4,868,811 | 9/1989 | Suzuki | 370/50 |

OTHER PUBLICATIONS

Dect, A General Overview by C. Van Diepenbeek, Sections 1,3 and 4.
System & Network Aspects of Dect by Andrew Bud, Sections 2, 3 and 6.
RAdio Aspects of Dect by Dr. Heinz Ochsner, Sections 3, 4, and 5.

*Primary Examiner*—Douglas W. Olms
*Assistant Examiner*—Min Jung
*Attorney, Agent, or Firm*—Val Jean F. Hillman

[57] ABSTRACT

An intelligent communcations node is capable of dynamically selecting frequency and time slot assignments for communications with remote communication devices having different communication protocols including different available frequencies and time slots in a TDMA system. A frequency agile transmitter and receiver combined with an adaptable time slot selector enables communications with remote devices utilizing different protocols. The time and frequency management capabilities of the node makes greater spectral efficiencies possible.

18 Claims, 6 Drawing Sheets

FREQUENCY AGILE TDMA COMMUNICATIONS SYSTEM

BACKGROUND OF THE INVENTION

This invention is generally directed to time division multiple access (TDMA) communications systems and is more specifically directed to a TDMA system having nodes which are capable of the time slot and frequency management thereby accommodating communications with different types of communication devices each having its own different time and frequency characteristics.

A number of communications systems exist in which a node or controller can communicate with a plurality of remote communication devices. In a conventional RF communications network, a base station communicates with various mobile and portable units utilizing a predetermined number of different frequency channels. In TDMA systems a predetermined frequency with a defined bandwidth is utilized to transmit frames of data with predetermined time slots allocated to different users.

Because of the efficiencies available with TDMA systems, a number of such systems exist and a variety of new systems are being developed, such as a digital European cordless telephone (DECT). A TDMA device designed for one system cannot communicate when in a different TDMA system because of different time slot protocols. The radio transmission of TDMA data adds yet another degree of complexity to communication between different systems since different frequencies and bandwidths are utilized.

There exists a need for a common communications node which can manage both time and frequency in order to be compatible with different TDMA communications devices.

DESCRIPTION OF A PREFERRED EMBODIMENT

Figure 1:
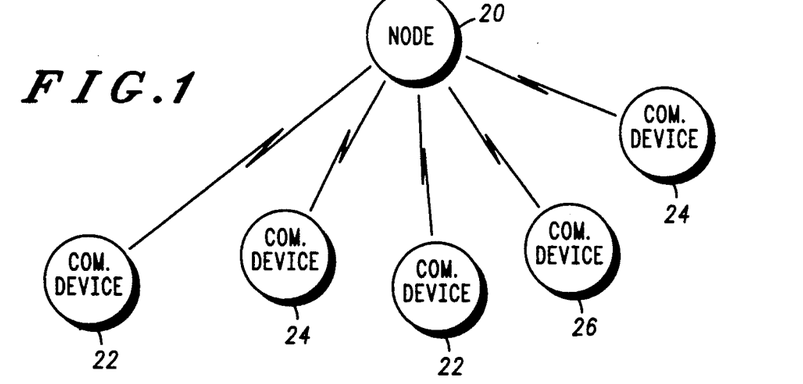
FIG. 1 illustrates a communication system in accordance with the present invention.

FIG. 1 shows an exemplary RF communications system having a node 20 in accordance with the present invention capable of RF communications with communication devices 22, 24, and 26. Each of the three different types of devices utilize a different TDMA protocol and communicate at different frequencies. Node 20 is capable of RF communications over a substantial range of frequencies including those used by the three different devices and is capable of managing the frequency and time factors in order to provide communications with each of the different types of devices. Although this illustrative system uses RF wireless communications, the present invention is generally applicable to communication systems which utilize modulated carriers within a TDMA environment.

Figure 2:
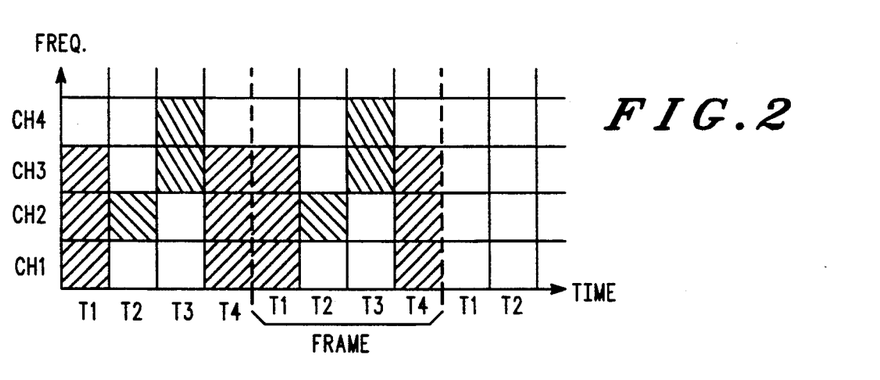
FIG. 2 is a graph illustrative of the time and frequency management capabilities of a node in accordance with the present invention.

FIG. 2 is a graph illustrating different time slots T1-T4 repeated as frames versus different frequency channels CH1-CH4. In the representative graph, three different types of TDMA devices are shown as being accommodated in each frame. In time slots T1 and T4, one type of device is accommodated by two time slots per frame and utilizes three contiguous channels CH1-CH3. The data transmitted during these time slots is accommodated by a carrier frequency at the center of channel CH2 with a bandwidth of 3 channels. In time slot T2 a second different device with less data throughput demand is accommodated on only frequency channel CH2. In time slot T3, a third different device is accommodated by utilizing bandwidth of frequency channels CH3 and CH4. Time slot T4 represents a second time slot allocation in addition to T1 within the frame for carrying data associated with the first device.

It should be understood that the representative graph is shown in simplified form to better convey an aspect of the present invention. The number of time slots per frame, the number of channels, and the bandwidth per channel will vary depending upon the demands placed upon and capacity of the communications system. Generally, a large number of time slots per frame is desired in order to have increased flexibility in accommodating different TDMA devices and different data throughput requirements. Similarly, frequency considerations will vary depending upon the number and type of different devices being accommodated within the system. The greatest flexibility in managing the system according to the present invention occurs when a continuous range of frequency spectrum is available in which varying bandwidths can be utilized.

It is becoming increasingly difficult to obtain sufficient frequency spectrum in order to support our communication needs. The present invention provides the opportunity to increase the ability to communicate within a previously assigned frequency spectrum for one type of communications by interleaving additional communications capacity in available time slots and frequencies. A node in accordance with the present invention has the capability of dynamically reconfiguring its time and frequency resources in order to adapt to different demands. Preferably the node will be preprogrammed with the definition of the communication protocols utilized by the different communication devices to be accommodated. Thus, the node can make time and frequency assignments consistent with the ability of remote devices to adapt within the particular protocol for each type of device.

Figure 3:
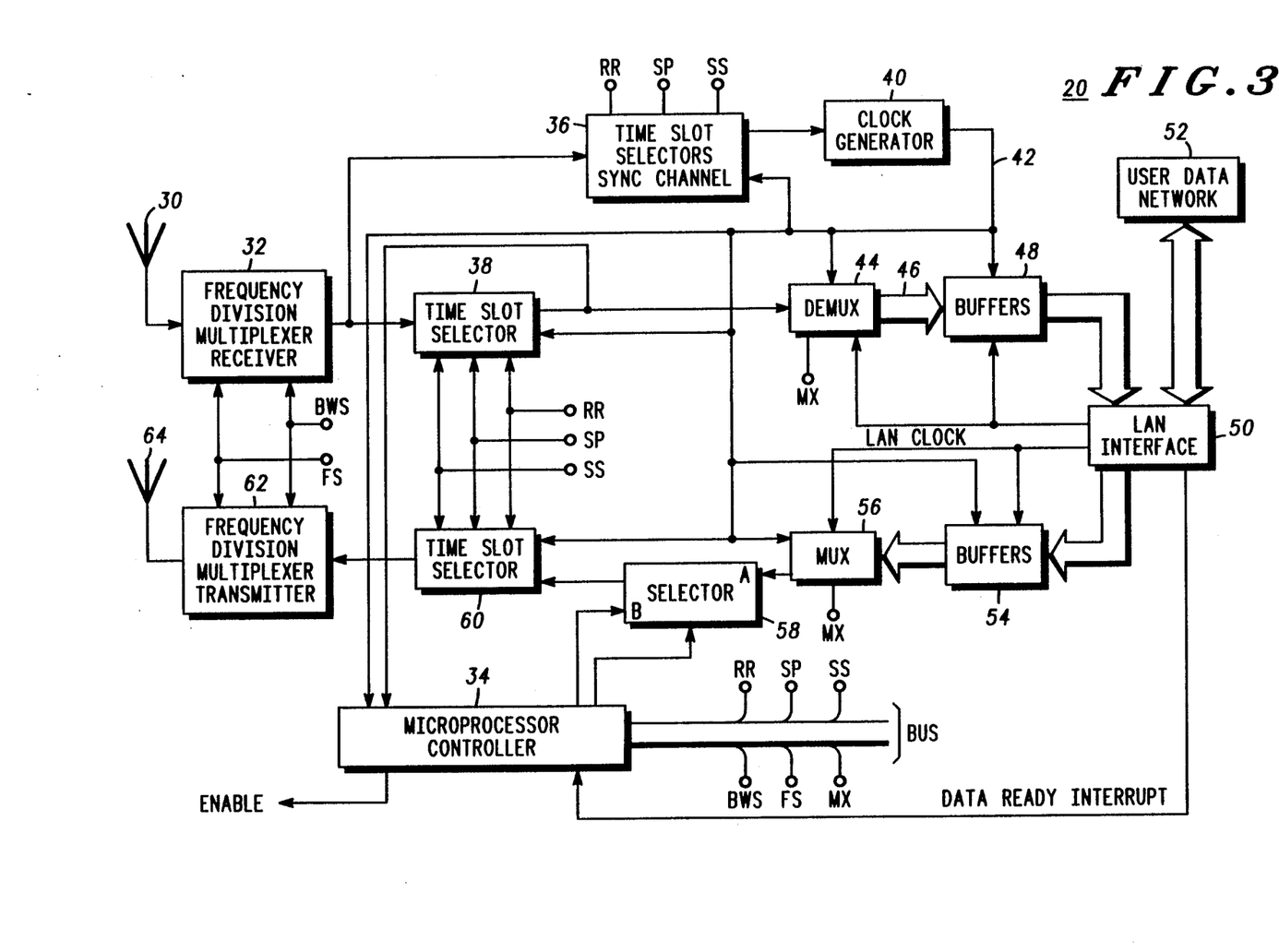
FIG. 3 is a block diagram of an embodiment of a node in accordance with the present invention.

FIG. 3 illustrates an embodiment of a node 20 in accordance with the present invention. The illustrative embodiment illustrates a node capable of accepting user data and transmitting that data to a remote communications device by an RF signal. The node is similarly capable of receiving an RF signal from a remote device which carries data that is demodulated and provided to a user network.

Signals from the remote devices are received by antenna 30 which is connected to frequency division multiplexer receiver 32. A microprocessor controller 34 provides control of the frequency and bandwidth of the receiver by means of frequency selection (FS) and bandwidth size (BWS) inputs. The receiver provides recovered digital data to time slot selectors (TSS) 36 and 38. The TSS 36 functions to derive time synchronization information from the received signals. The TSS 38 serves to recover the TDMA encoded data by appropriate time slot selection. The controller 34 provides control information to the selectors 36 and 38 including defining the repetition rate (RR), i.e. number of slots per frame containing the desired information, slot position (SP) which defines the beginning of the time slot within the frame, and the slot size (SS) which defines the length of time of each slot. It should be noted that several adjacent time slots may be defined as a single time slot for purposes of time management. The output of TSS 36 only contains time information which is utilized by clock generator 40 which provides an output digital clock reference 42 utilized for general timing and synchronization of the node. The TSS 38 provides an output of data which has been time segregated corresponding to the different data sources to demultiplexer 44. Input control signal MX from controller 34 provides the demultiplexer with select information for routing the received data to corresponding data channels 46. The data on these channels is preferably buffered by elastic buffers 48 before being coupled to local area network (LAN) interface 50 such as suited for use in an Ethernet environment. This interface controls the flow of information to and from the user data network 52 by which the individual data channels are ultimately routed to different users.

Summarizing the reception of signals from remote users, a frequency agile receiver 32 selects different frequencies and bandwidths for corresponding time slots utilized for each different type device. The data recovered by the receiver is further processed by the TSS to identify the different data information residing in the different time slots. This recovered information is then segregated into corresponding different data outputs by the demultiplexing process and ultimately routed to the user by a data network.

The transmission of data from the user data network 52 to remote devices is accomplished as follows. The LAN interface 50 accepts data addressed to a remote device from user data network 52 and transfers the data to elastic buffers 54. The buffers are preferably implemented as mapped memory controlled by controller 34. The data stored in the buffers is transferred to multiplexer 56 which multiplexes the different data information into a single data stream. Buffers 54 and multiplexer 56 each receive clock information from the LAN interface and clock generator 40 for the synchronized transfer of data. A selector 58 selects between input A from multiplexer 56 and input B from controller 34. Its output is coupled to time slot selector 60. The control input to selector 58 is provided by controller 34. This permits the controller to insert relevant data to be communicated to the remote devices. The TSS 60 receives the output from selector 58 and organizes the received data in accordance with the frame and time slot protocol to be utilized, similarly to the decoding accomplished by TSS 38. The frequency division multiplex transmitter 62 receives the output data stream from TSS 60 and transmits a modulated signal using antenna 64. The frequency and bandwidth of FDM transmitter 62 is determined by controller 34 via inputs FS and BWS.

Summarizing the transmission of data to remote devices, data destined for remote devices is buffered and multiplexed together to form a single data stream which together with system control data provided by controller 34 is segmented into appropriate time slots by the TSS. The output of the TSS is received and modulated at an appropriate frequency and bandwidth compatible with the receiver of the corresponding remote device.

Figure 4:
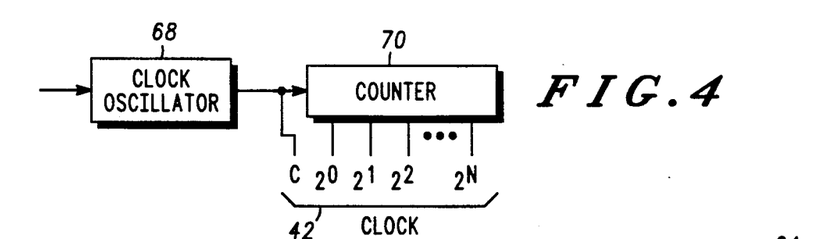
FIG. 4 is a block diagram illustrating the clock generator of FIG. 3.

FIG. 4 is a block diagram illustrating an embodiment of a clock generator 40. The time synchronization output from TSS 36 is received by a clock oscillator 68. Its phase is adjusted by this output and maintains time synchronization between the transmitted and received signals. A counter 70 receives the clock output pulses from clock oscillator 68. The data clock output 42 consists of the basic clock rate C and taps from each of the divide by two stages up to $2^n$ of counter 70. The clock output 42 consists of digital data which continues to periodically cycle from zero to $2^{n+1}$.

Figure 5:
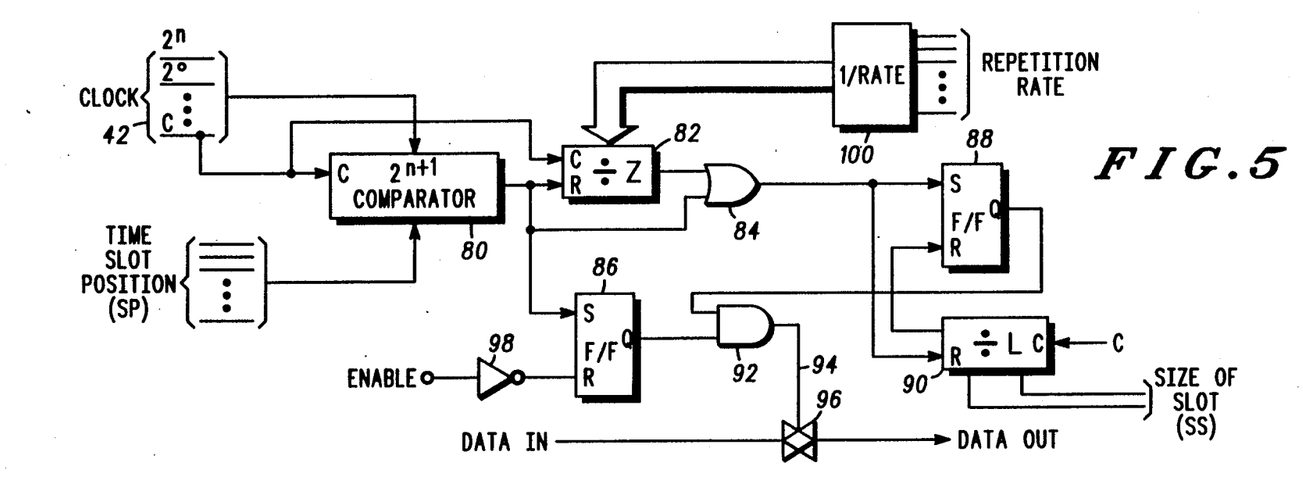
FIG. 5 is a block diagram illustrating an embodiment of a time slot selector (TSS) utilized in FIG. 3.

FIG. 5 is a block diagram of an exemplary embodiment of a time slot selector (TSS). A digital $2^{n+1}$ comparator 80 compares data clock 42 with the time slot position (SP) generated by controller 34 for each clock C. The SP position corresponds to the time slot of the selected data to be transmitted or received. The exemplary system according to the present invention operates in a half duplex mode so that data from the node can be only transmitted or received in one direction at a given time. The output of the comparator consists of a digital control line which provides a true or false indication relative to each comparison. A match (true) by comparator 80 marks the beginning edge of the time slot positioned for the corresponding data and causes divider 82 to be reset, provides an enabling input to OR gate 84, and sets RS flip flop 86. A true output of OR gate 84 sets RS flip flop 88 and resets divider 90. Since both flip flops 86 and 88 have been set, both inputs to AND gate 92 are true causing the AND gate output to provide a control signal 94 to data transmission gate 96 causing it to open or pass data.

An enable input to flip flop 86 through inverter 98 is provided by controller 34. The enable signal is provided when the RR, SP, and SS control signals are being generated by the microprocessor and are stable. During transitions by the controller 34, these signals are not stable. The enable serves to reset flip flop 86 causing its output to change state and thereby causing AND gate 92 to be inhibited thereby causing control 94 to block the flow of data. The divider 90 is programmed to divide by L which is set by the SS control and corresponds to the size or length of the time slot. The input clock C is divided by divider 90 which provides an output resetting flip flop 88 upon reaching the count of L. This represents the length of time of the corresponding time slot. This causes the output of flip flop 88 to change state thereby inhibiting AND gate 92 and causing transmission gate 96 to block the flow of data. Thus, gate 96 permits the flow of data beginning with the recognition of the beginning of the proper time slot and ending with the recognition of the end of the corresponding time slot.

The repetition rate (RR) provides an input to division function 100 which calculates one divided by the repetition rate. It will be known that this function may be carried out either in conventional hardware or implemented as part of a software routine to provide the division function. The quotient of this division process provides an input to divider 82 and defines the division Z to be provided by the divider. The least significant bit C of clock 42 provides the clock input to divider 82. The output from comparator 80 resets the divider. The output of the divider provides the other input to OR gate 84 and is thus capable of setting flip flop 88 every Z interval. This permits periodic spaced apart time slots for the same data to be utilized within a frame. The first time slot is activated by the initial true output from comparator 84 by its input to gate 84. The time slot ends as determined by the count of L by divider 90. If another time slot is provided within a frame for the corresponding data, OR gate 84 will again enable flip flop 88 upon divider 82 reaching the Z count and will mark the beginning of each time slot for every Z interval following the initial time slot determination by comparator 80. It will be apparent that the maximum repetition rate (Z) must be greater than the size of the slot (L).

Figure 6:
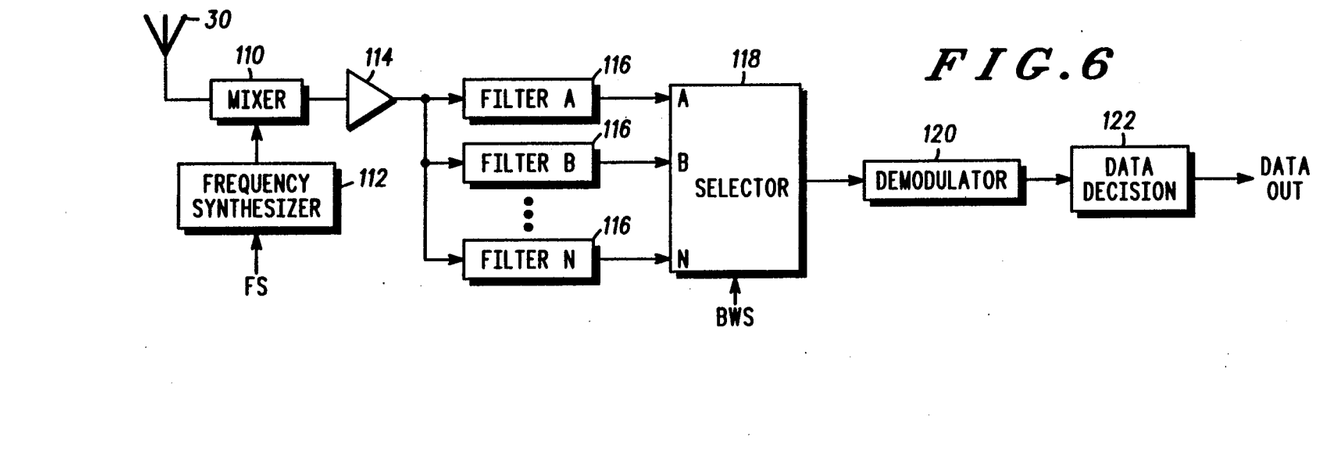
FIG. 6 is a block diagram of an embodiment of a frequency division multiplex receiver of FIG. 3.

FIG. 6 is a block diagram of a illustrative embodiment of a frequency division multiplex receiver 32. Received signals from antenna 30 provide one input to mixer 110. The other input to the mixer is provided by the output of frequency synthesizer 112. The frequency selected by the synthesizer is controlled in accordance with the frequency select (FS) input from controller 34. The mixer output is amplified by an intermediate frequency amplifier 114 which provides its output to n filters 116. The output of each filter is provided to a selector 118 capable of selecting one of n inputs to be coupled to its output. The input selected by selector 118 is controlled in accordance with the BWS input received from controller 34. The output signal from the selector is demodulated by demodulator 120 to provide a baseband output to data decision 122. The decision function 122 makes a decision based on the demodulated output signal as to what original digital data was transmitted and provides a digital data output. The demodulation and data decision process is generally well-known and is implemented by RF receivers and modems.

The receiver is capable of receiving different remote device frequencies by the controller 34 causing frequency synthesizer 112 to generate the proper injection frequency to mixer 110 for the proper IF frequency output. The bandwidth of the transmitted signal is matched by selecting an appropriate output from one of the filters 116 by selector 118 in accordance with the bandwidth selection signal provided by controller 34. It is generally desirable to use the narrowest filter which can pass the desired signal in order to provide maximum attenuation to undesired signals outside the desired signal band.

Figure 7:
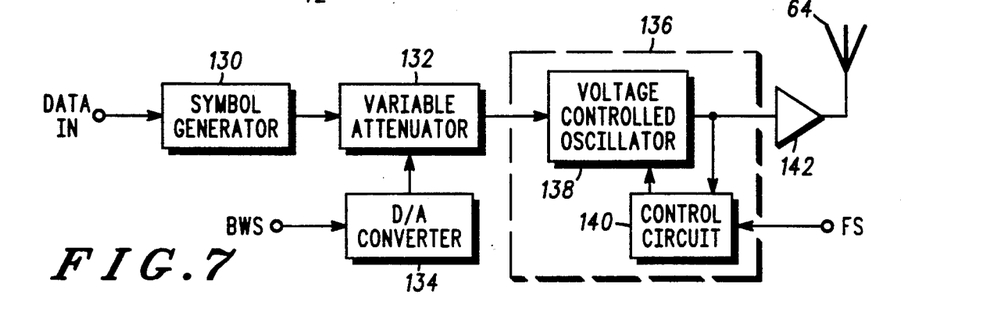
FIG. 7 is a block diagram of an embodiment of a frequency division multiplex transmitter of FIG. 3.

FIG. 7 is a block diagram of an embodiment of an FDM transmitter in accordance with the present invention. Digital data to the transmitter is received by a symbol generator 130 which generates symbols representative of each bit or byte of data to be transmitted. Such generators are generally well-known. The output of generator 130 is attenuated by variable attenuator 132. The amount of attenuation provided is electrically controlled by the output from digital to analog converter 134 based upon the BWS input by controller 34. Following attenuation, the attenuated symbol provides an input to frequency synthesizer 136 and more specifically to the modulation control input of voltage controlled oscillator 138 of the synthesizer. The conventional phase detector and divider circuits comprising a conventional frequency synthesizer is provided by control circuit 140. The FS input from controller 34 is utilized to set the carrier frequency of the synthesizer. The output of the synthesizer is amplified by amplifier 142 which provides its output to antenna 64 for transmission to remote devices.

The BWS input controls the level of attenuation and hence bandwidth thereby causing the maximum amount of modulation provided to synthesizer 136 to vary. The frequency of the synthesizer is controlled by the FS input. Thus the carrier frequency and maximum modulation (bandwidth) can be varied in accordance with the present invention.

Figure 8A:
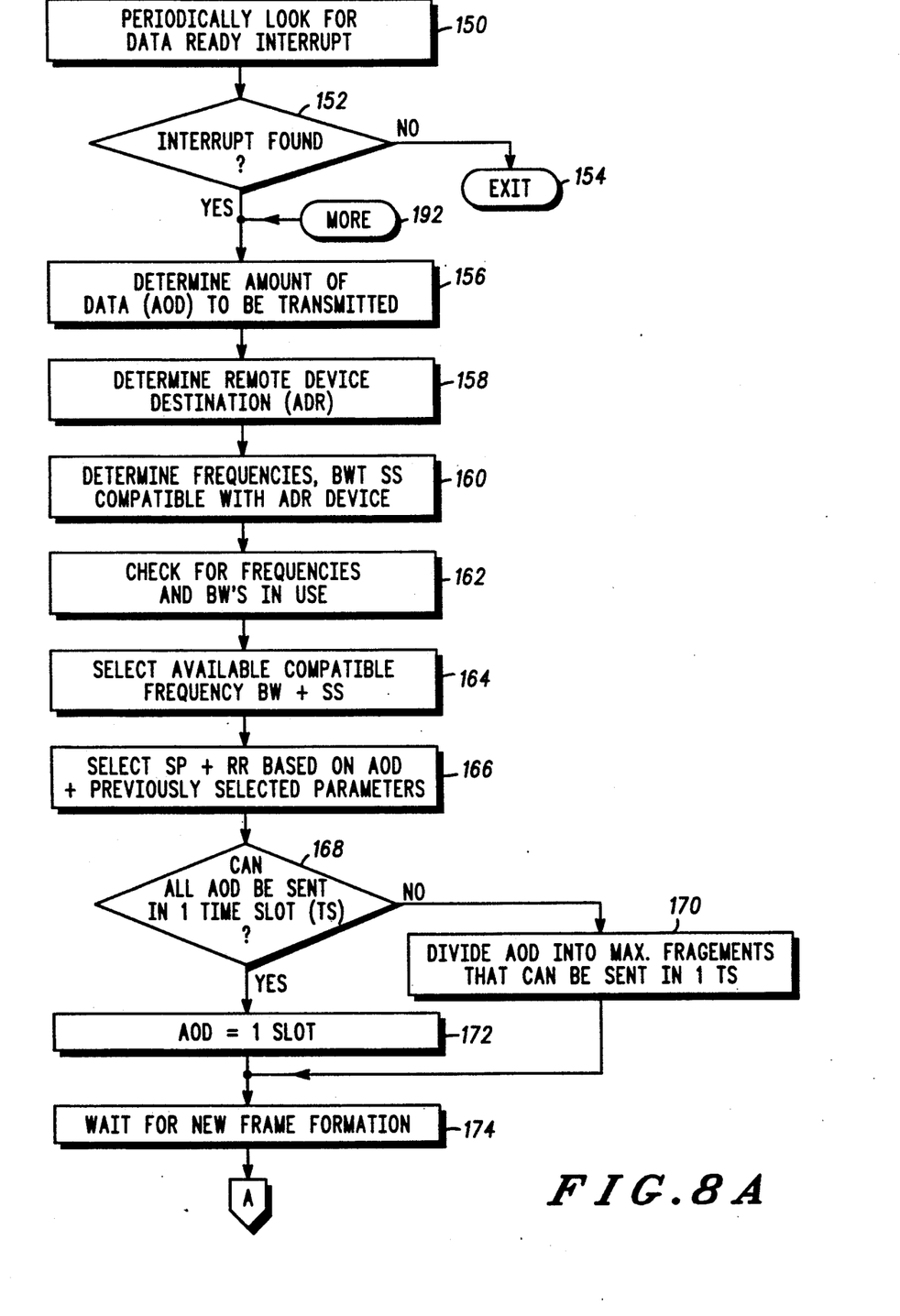
FIGS. 8A and 8B are flow chart of steps for the transmission of data by a node in accordance with the present invention.
Figure 8B:
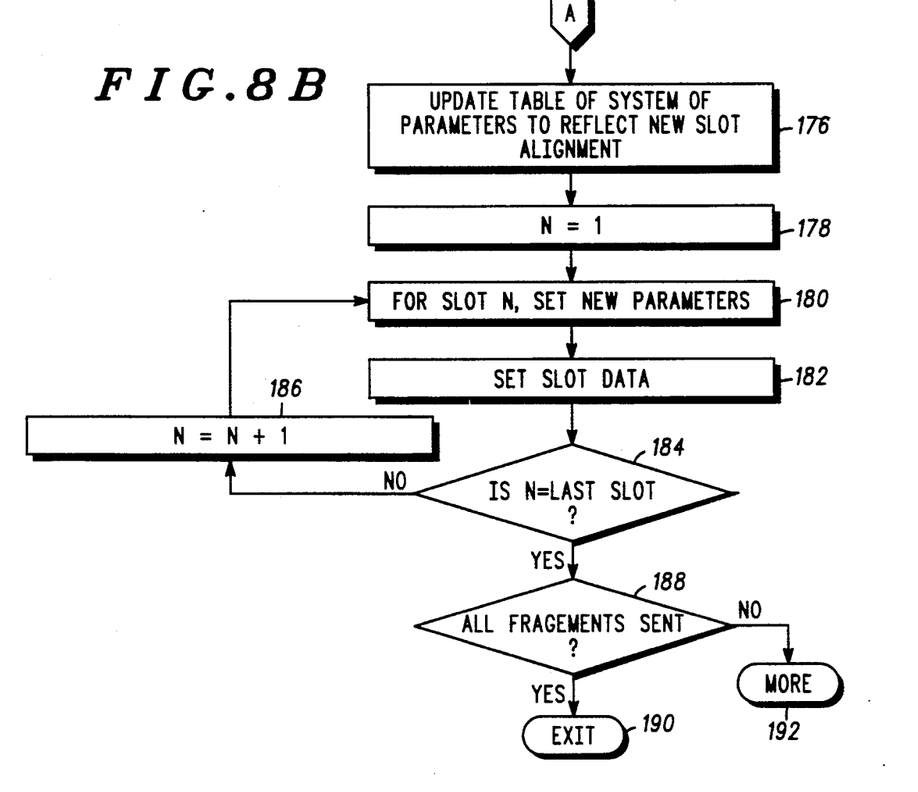

FIG. 8 is a flow diagram illustrating control exercised by the microprocessor controller 34 in transmitting data from a node to a remote device. As indicated by step 150, the controller periodically looks for data ready interrupts generated by the LAN which indicates there is data to be transmitted. Decision step 152 determines if an interrupt has occurred. If NO, the flow ends at EXIT 154. If YES, controller executes step 156 and determines the amount of data (AOD) to be transmitted. The AOD may be available as information as part of the transmission from the LAN or can be derived based on the amount of buffer memory occupied by the data. Then a determination is made as to the remote device destination (ADR) in step 158. This information is part of the header supplied by the LAN for routing. Next, a determination is made of the frequencies, bandwidth and step sizes compatible with the ADR in step 160. To avoid collisions, a check is then made for frequencies and bandwidths in use at step 162. In step 164, an available and compatible frequency bandwidth and slot size is selected. The selection of slot position and repetition rate based on AOD in previously parameters occurs in step 166. Decision step 168 determines if all AOD can be sent in one time slot. If NO, the AOD is divided into maximum segments that can be sent in one time slot by step 170. If decision 168 is YES, the AOD is defined as one time slot by step 172.

In accordance with step 174 new data transmission parameters are not entered until the beginning of a new frame. Thus, the system can be reconfigured at the beginning of a frame to include the transmission of new information to be transmitted or the transmission of information which could not be accommodated in the preceding frame or frames. The table of system parameters is updated to reflect new slot assignments in step 176. A variable N is set equal to 1 in step 178. In step 180 the new parameters are set for slot N. The data corresponding to slot N is transmitted by step 182. The decision step 184 determines if N is the last slot. If NO, then step 186 increments N and returns control to step 180 to form a loop. Upon a YES decision by step 184, decision step 188 determines if all fragments have been sent. If YES, these steps end at EXIT 190. A NO decision indicates more fragments remain to be sent than could be accommodated during the preceding frame and control passes to MORE 192 which allows the remainder of fragments to be identified and retransmitted during the next frames.

Summarizing the transmission of data from the node to a remote device, user information entering the node is detected and appropriate frequency and time parameters are selected to enable transmission of the data to the destination device. The frequency and time characteristics of the remote device are known and stored in the node so that appropriate time and frequency selections can be made within the capabilities of each type of remote device. This permits time and frequency management to occur thereby enhancing spectral efficiencies where possible. The data or fragments of the data are transmitted on a time slot basis within each frame.

With the capability of the present invention, maximum spectral efficiencies will exist where at least one of the remote device types has a substantial degree of frequency and time slot flexibility allowing communications with such a device at frequencies and during times at which other less flexible remote devices are not capable of operation. The node is capable of communicating with such a flexible remote device by sending instructions at a predetermined frequency and time slot instructing the remote device which frequency and time slot(s) are to be utilized in order to minimize contention for frequencies and times utilized by other devices. This allows maximum utilization of the communications ability of the node over its frequency and time management capacity.

Figure 9A:
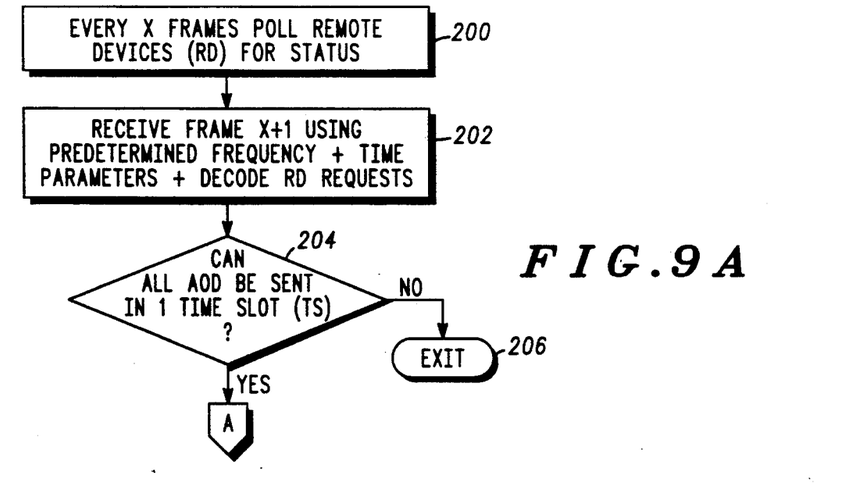
FIGS. 9A and 9B are a flow chart of steps for the reception of data by a node in accordance with the present invention.
Figure 9B:
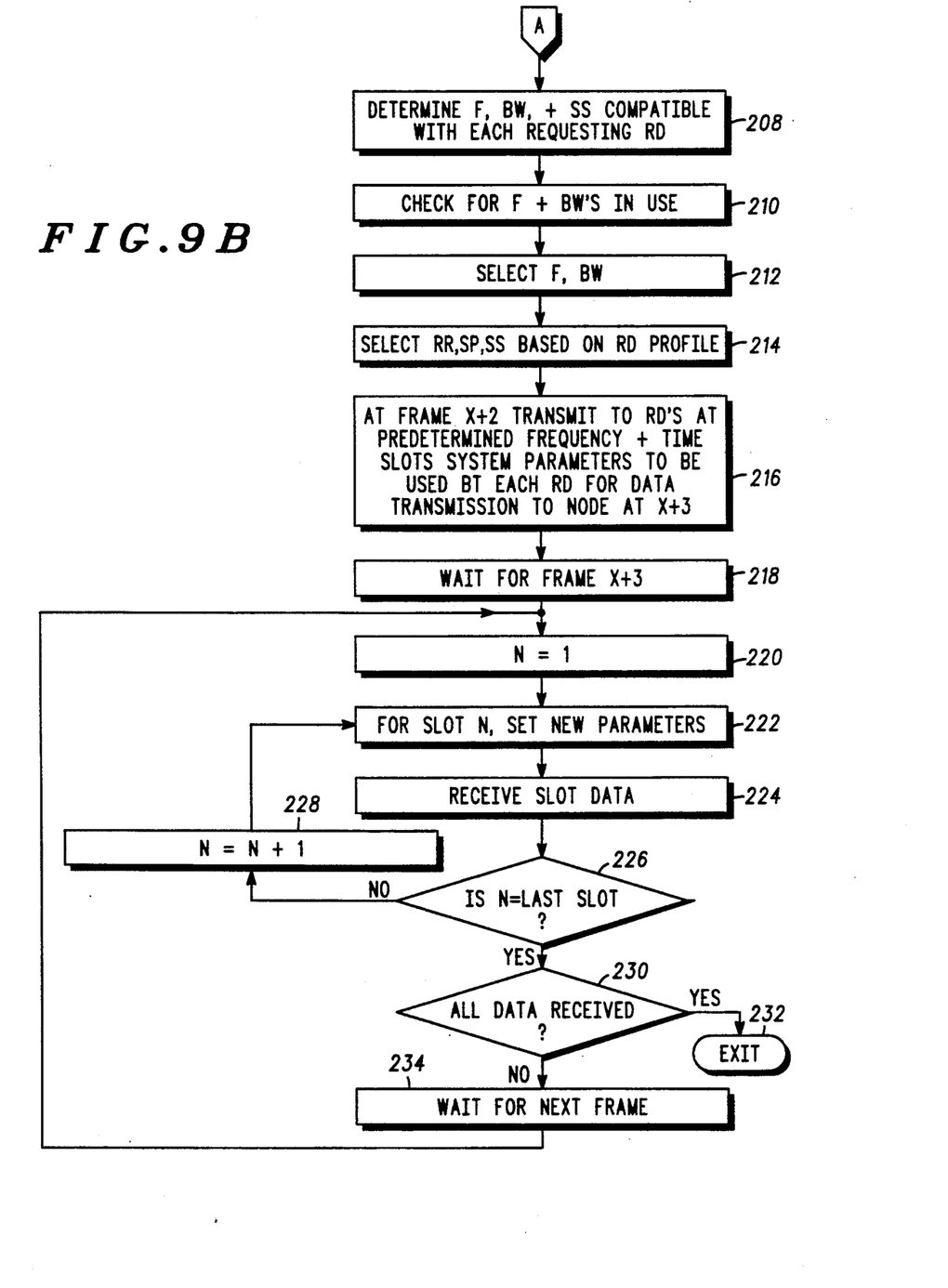

FIG. 9 is a flow diagram illustrating a method in accordance with the present invention for receiving information from the remote devices. In step 200, the node polls each type of remote device every X frames for a status indication. Each of the remote device types will be assigned to predetermined frequencies and time slots for receiving the corresponding poll with different devices of the same type being assigned different time slots. In step 202 frame X+1 is received by the node using predetermined frequency and time parameters established for each type of remote device. During this frame each remote device needing to transmit data to the node will send its request containing appropriate information such as amount of data to be transmitted. This request information is decoded by the node.

In decision step 204 a decision is made if any remote device has made a request to send data to the node. If NO, the process ends at EXIT 206 since no further information is to be received from the remote devices. If YES, a determination is made to determine compatible frequencies, bandwidths, and slot sizes for each RD requesting to transmit data in step 208. Frequencies and bandwidths in use by other devices are checked by step 210 to avoid conflicting assignments. In step 212 the node selects an appropriate frequency and bandwidth of each requesting remote device. The repetition rate, slot position, and slot size are selected by the node based on a stored remote device profile and the previously identified amount of information to be transmitted from the remote device in step 214.

In step 216 the node transmits, at frame X+3 on predetermined frequency and time slots to the remote devices, the system parameter information to be utilized by each remote device for data transmission to the node during frame X+3. In step 218 the node waits for frame X+3 and then initializes parameter N equal to 1 at step 220. In step 222 the node sets parameters to be used for slot N for receiving transmissions from remote devices using parameters previously defined for such transmissions. Data is received in slot N in step 224. Decision step 226 determines if N is the last slot in frame X+3. If NO, N is incremented in step 228 and control returned to step 222 for reception of further data. If decision step 226 is YES, decision step 230 determines if all data has been received from the remote devices. This determination is possible since in the preceding poll response from the remote devices included the length of data to be transmitted. If YES, i.e. all data to be transmitted from remote devices has been received, then the steps end at EXIT 232. If the decision of step 230 is NO which indicates that more data is to be received, the node waits for the next frame at step 234 and then repeats the reception cycle by returning to step 220. This permits the remainder of the data to be transmitted from the remote devices to be received in succeeding frames.

Summarizing the reception of data from remote devices, the node periodically polls the devices to determine if information is to be transmitted. In the frame following the polling frame, information is received from the remote devices on predetermined signalling frequencies and times containing status or request to transmit data information. Selection of appropriate signal parameters to be utilized for the data transmission is made. This parameter information is transmitted to the remote devices during a following frame. The succeeding frames are utilized for the reception of data from the remote devices until the transmission of this information is complete.

Although embodiments of the present invention have been shown and illustrated, the scope of the invention is defined by the claims which follow.

We claim:

1. In a communications system having a node and at least first and second time division multiple access (TDMA) remote devices, the first device having a first communications protocol utilizing first frequencies and time slots, the second device having a second communications protocol utilizing second frequencies and time slots, the first protocol being different from the second protocol, the improvement in the node comprising:
   means for selectively receiving signals from said first and second devices on said first and second frequencies and generating received composite data;
   means for separating said received composite data into corresponding data channels in accord with said first and second time slots utilized by said first and second remote devices;
   means for combining data from user data channels coupled to said node to form composite user data in accord with said first and second time slots utilized by said first and second remote devices;
   means for selectively transmitting signals representing said composite user data to said first and second devices on said first and second frequencies;
   means for switching receiving and transmitting frequencies used by said receiving and transmitting means so that the receiving and transmitting frequencies correspond to said transmitting and receiving frequencies used by said first and second remote devices, respectively, when signals are being communicated between said remote devices and the node.

2. The communications system according to claim 1 further comprising means for identifying time slots to be used by the first and second devices.

3. The communications system according to claim 2 further comprising means for identifying the frequencies to be used by the first and second devices.

4. The communication system according to claim 2 further comprising means for identifying the frequencies to be used by the first and second devices.

5. The communications system according to claim 1 wherein said separating means comprises a time slot selector that synchronizes the received composite data into separate data bound for separate users.

6. The communications system according to claim 1 wherein said combining means comprises a time slot selector that synchronizes data from separate users into a single stream of data corresponding in time to the first and second time slots used by the first and second remote devices.

7. In a communications system having a node and at least first and second time division multiple access (TDMA) remote devices, the first device having a first communications protocol utilizing first frequencies and time slots, the second device having a second communications protocol utilizing second frequencies and time slots, the first protocol being different from the second protocol, a node communication method comprising the steps of:
- selectively receiving signals from said first and second devices on said first and second frequencies and generating received composite data;
- separating said received composite data into corresponding data channels in accord with said first and second time slots utilized by said first and second remote devices;
- combining data from user data channels coupled to said node to form composite user data in accord with said first and second time slots utilized by said first and second remote devices;
- selectively transmitting signals representing said composite user data to said first and second devices on said first and second frequencies;
- switching receiving and transmitting frequencies used by said receiving and transmitting steps so that the receiving and transmitting frequencies correspond to said transmitting and receiving frequencies used by said first and second remote devices, respectively, when signals are being communicated between said remote devices and the node.

8. The communications method according to claim 7 further comprising the step of identifying time slots to be used by the first and second devices.

9. The communications method according to claim 7 further comprising the step of identifying the frequencies to be used by the first and second devices.

10. The communications method according to claim 8 further comprising the step of identifying the frequencies to be used by the first and second devices.

11. The communications method according to claim 7 wherein said separating step comprises synchronizing the received composite data into separate data bound for separate users.

12. The communications method according to claim 7 wherein said combining step comprises synchronizing data from separate users into a single stream of data corresponding in time to the first and second time slots used by the first and second remote devices.

13. A communications node for communicating with at least first and second time division multiple access (TDMA) remote devices having different time and frequency protocols comprising:
- means for selectively receiving signals from first and second remote communication devices on first and second frequencies and generating received composite data;
- means for separating said received composite data into corresponding data channels in accord with first and second time slots utilized by said first and second remote devices;
- means for combining data from user data channels coupled to said node to form composite user data in accord with said first and second time slots utilized by said first and second remote devices;
- means for selectively transmitting signals representing said composite user data to said first and second devices on said first and second frequencies;
- means for switching receiving and transmitting frequencies used by said receiving and transmitting means to correspond to said transmitting and receiving frequencies used by said first and second remote devices, respectively, when signals are being communicated between said remote devices and the node.

14. The node according to claim 13 further comprising means for identifying time slots to be used by the first and second devices.

15. The node according to claim 13 further comprising means for identifying the frequencies to be used by the first and second devices.

16. The node according to claim 14 further comprising means for identifying the frequencies to be used by the first and second devices.

17. The node according to claim 13 wherein said separating means comprises a time slot selector that synchronizes the received composite data into separate data bound for separate users.

18. The node according to claim 13 wherein said combining means comprises a time slot selector that synchronizes data from separate users into a single stream of data corresponding in time to the first and second time slots used by the first and second remote devices.

* * * * *